US006847324B1

(12) United States Patent
Honey et al.

(10) Patent No.: US 6,847,324 B1
(45) Date of Patent: Jan. 25, 2005

(54) AUTOMATED METHOD TO REMOVE FALSE ECHOES DUE TO SOLAR INTERFERENCE

(75) Inventors: Steven John Honey, Holliston, MA (US); Dennis Andrew Lang, Salem, NH (US)

(73) Assignee: WSI Corporation, Billerica, MA (US)

( * ) Notice: Subject to any disclaimer, the term of this patent is extended or adjusted under 35 U.S.C. 154(b) by 0 days.

(21) Appl. No.: 10/674,164

(22) Filed: Sep. 29, 2003

(51) Int. Cl.[7] .................. G01S 7/292; G01S 13/95; G01S 7/40
(52) U.S. Cl. ............ 342/91; 342/26 R; 342/26 D; 342/89; 342/94; 342/159; 342/165; 342/173; 342/175; 342/195
(58) Field of Search .............. 342/22, 26, 89–103, 342/165–175, 192–197, 1–19, 109, 351, 26 R–26 D, 159–164; 455/226.1

(56) References Cited

U.S. PATENT DOCUMENTS

| | | | | |
|---|---|---|---|---|
| 2,458,654 A | * | 1/1949 | Southworth | 342/7 |
| 3,171,126 A | * | 2/1965 | Wiley | 342/109 |
| 3,196,433 A | * | 7/1965 | Barton et al. | 342/13 |
| 3,435,345 A | * | 3/1969 | Ashby | 455/226.1 |
| 3,737,905 A | * | 6/1973 | Haroules et al. | 342/351 |

FOREIGN PATENT DOCUMENTS

| | | | | |
|---|---|---|---|---|
| JP | 54-93996 A | * | 7/1979 | G01S/7/40 |
| JP | 55-65170 A | * | 5/1980 | G01S/7/40 |
| JP | 56-14164 A | * | 2/1981 | G01R/29/10 |
| JP | 59-35165 A | * | 2/1984 | G01S/7/40 |
| JP | 63-52079 A | * | 3/1988 | G01S/7/40 |
| JP | 63-142281 A | * | 6/1988 | G01S/7/36 |

OTHER PUBLICATIONS

A.K. Subramanian et al., "Need for an Integrated Approach to Mitigate EMX–Problems"; Proceedings of the Intl. Conf. on Electromagnetic Interference and Compatibility; pp. 405–412; IEEE, New York, 1995.*

* cited by examiner

Primary Examiner—Bernarr E. Gregory
(74) Attorney, Agent, or Firm—Woodcock Washburn LLP

(57) ABSTRACT

Systems and methods for automated detection and removal of solar interference in real time from NEXRAD or other similar radar products. The radar site latitude and longitude and scan elevation time are extracted from the radar data and a position of the Sun is determined for the extracted latitude and longitude and scan time. A radial that has been contaminated with solar interference is determined and the solar interference is removed from that radial; The removal process does not impact the timeliness of critical products, and conservatively removes solar interference. In addition inaccuracies with NEXRAD clock time synchronization are accounted for to ensure accurate results.

25 Claims, 9 Drawing Sheets

AUTOMATED METHOD TO REMOVE FALSE ECHOES DUE TO SOLAR INTERFERENCE

FIELD OF THE INVENTION

The present invention relates to weather radar processing and display. In particular, the present invention is directed to a method of removing false echoes from weather radar data caused by solar interference.

BACKGROUND OF THE INVENTION

As is known in the art, NEXRAD radar sites perform elevation scans at various angles to collect weather-related data. FIG. 1 illustrates the various elevation angles that a NEXRAD radar site may scan and the range for each scan angle. NEXRAD radar sites may experience interference caused by the radar detecting electromagnetic radiation from another source, most often another radar or the Sun. The Sun particularly poses problems near sunrise and sunset at elevation scan angles approximately equal to the angle of the Sun. The interference generally corrupts one or more radials of radar data, and particularly affects most or all of a radial, usually out to the maximum range. Such interference from the Sun is known in the art as a "Death Ray," which will be used herein to mean false echoes that occur near sunrise and sunset which are caused by solar radiation. Examples of the false echoes are shown in FIGS. 2 and 3, as "Death Rays" 10, 12, 14, 16 and 18.

A problem is that NEXRAD radar data provided by the National Weather Service does not contain any logic to detect and/or correct for interference from the Sun. The problem is so large that over 300 of the NEXRAD 0.5 degree Base Reflectivity products are affected by the Death Ray effect each day. The number increases if all NEXRAD elevation scans are included. This problem results in degraded radar products, as is evidenced by FIGS. 2 and 3, where the inclusion of the Death Rays 10, 12, 14, 16 and 18 makes the product more difficult to interpret.

Another problem is that radials are wider as they go out in range (e.g., the radials look similar to a baseball bat, with the narrow end towards the radar and the fat end pointing at the source of contamination). Thus, it is likely that real echoes will be embedded within the false echoes. When interference is encountered, the reflectivity values increase with range, with a maximum being about 35 dBZ. The interference appears for one or two volume scans for a single elevation and up to 30 minutes on a Composite Reflectivity product. Other reflectivity derived products, such as echo tops, layer reflectivity and composite reflectivity are also affected. Still further, radial velocity and spectrum width products usually indicate range-aliased data, and due to radial velocity corruption, the mesoscale process can be negatively affected.

Yet another problem is that many of the NEXRAD site clocks are not synchronized to a standard time, thus making the calculation of the Sun's position less accurate. Thus, without a certain time reference, automatic identification and removal of the Death Ray is difficult as the Sun's position relative to the particular radar scan cannot be accurately determined.

Given the right tools and time, a trained Meteorologist can manually identify and remove the false echoes. This is the approached used by providers such as WSI of Billerica, MA for their NOWrad product which is available every 15 minutes. However, there is a significant drawback to this method as it delays the release of the product for up to 7 minutes. This is a significant amount of time, especially when there is fast changing weather. As a result, for more timely products, such as WSI's 5-Minute NOWrad PLUS and Premium NOWrad, manual removal is not practical.

Thus, there is a need for a system of automatic removal of Death Ray effects that can be quickly and automatically performed. In addition, there is a need for a system of automatic removal of Death Ray effects that is very accurate and does not remove real echoes. The present invention provides for such a system.

SUMMARY OF THE INVENTION

The present invention is directed to systems and methods for automated detection and removal of Death Rays due to solar interference. In accordance with the present invention, the removal process is applied in real time to NEXRAD BREF1 products or other similar radar products. The removal process does not impact the timeliness of critical products, and conservatively removes solar interference. In other words, the process may leave in some false echoes rather than to remove real echoes. Still further, the present invention overcomes problems with inaccuracies with NEXRAD clock time synchronization.

In accordance with an aspect of the present invention, there is provided a method of removing solar interference from radar data. The method includes extracting a site latitude, a site longitude and scan elevation time from the radar data; determining the position of the Sun for the extracted latitude and longitude and scan time; determining a radial that has been contaminated with solar interference; and removing the solar interference.

In accordance with a feature of the invention, the removal process is only performed if the Sun's position is within a threshold elevation angle of an elevation scan angle. The threshold elevation angle may be between 0.5 and 1.3 degrees.

In accordance with another feature, the method accounts for inaccuracies in a clock at a radar site from which the radar data was received. This may include identifying the radial closest to a Sun azimuth and its neighbors and sorting a predetermined number of radials closest to the Sun position based on a number of non-zero echoes in each radial.

In accordance with yet another feature, determining a radial contaminated with solar interference may include determining if the number of non-zero echoes in a highest priority radial exceeds a second predetermined threshold; determining if a difference of the number of non-zero echoes between the highest and lowest radial exceed a percentage threshold; and determining if a three highest priority radials are azimuthally consecutive, and if so, returning a middle radial, otherwise returning a radial with the highest number of non-zero echoes.

In accordance with another feature, removing the solar interference further may include for each range gate of a radial N identified as being contaminated by solar interference, determining if an echo in a current range gate exceeds an intensity threshold; and for echoes in the current range gate that do not exceed the intensity threshold, examining the current range gates for radials N–2 and N+2 determine if an echo for the current range gate for those radials is zero. The intensity threshold may be variable over a length and increase as the range increases for a radial. If the range gates for the radials N–2 and N+2 are not zero, then the value of the current range gate for radial N is not changed and the next range gate for the radial N is examined.

However, if the range gates for the radials N−2 and N+2 are zero, then the value of the current range gate for radial N is changed to zero and the next range gate for the radial N is examined.

In addition, for each range gate of the N+1 and N−1 radials, the process may determine if an echo in a current range gate in the N+1 or N−1 radial does not exceed the intensity threshold; and if an echo in the current range gate in the N+1 or N−1 radial does not exceed the intensity threshold, examine if the current range gates for both radials N−1 and N+1 are zero; and set a value of the current range gate for the radial N to 0 if the current range gates for both radials N−1 and N+1 are zero.

In accordance with another aspect of the invention, there is provided a method of determining if radar data contains solar interference. The method includes extracting a site latitude, a scan longitude and scan elevation time from the radar data; determining the position of the Sun for the extracted latitude and longitude and scan time; determining if an elevation angle of the Sun is within a threshold elevation angle of a scan elevation angle; and examining radar data for radials closest to the Sun's position if the Sun is within the threshold elevation angle.

In accordance with a feature of the invention, the threshold elevation angle is between 0.5 and 1.3 degrees.

In accordance with another feature, examining radar data for radials closest to the Sun's position further may include determining if the number of non-zero echoes in a highest priority radial exceeds a second predetermined threshold; determining if a difference of the number of non-zero echoes between the highest and lowest radial exceed a percentage threshold; and determining if a three highest priority radials are azimuthally consecutive, and if so, returning a middle radial, otherwise returning a radial with the highest number of non-zero echoes.

In accordance with yet another feature, the method may further include removing the solar interference from radials containing the solar interference in accordance with the first aspect of the invention.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention where like elements have like reference numerals; however, the invention is not limited to the specific methods and instrumentalities disclosed. In the drawings.

DETAILED DESCRIPTION OF ILLUSTRATIVE EMBODIMENTS

Figure 6:
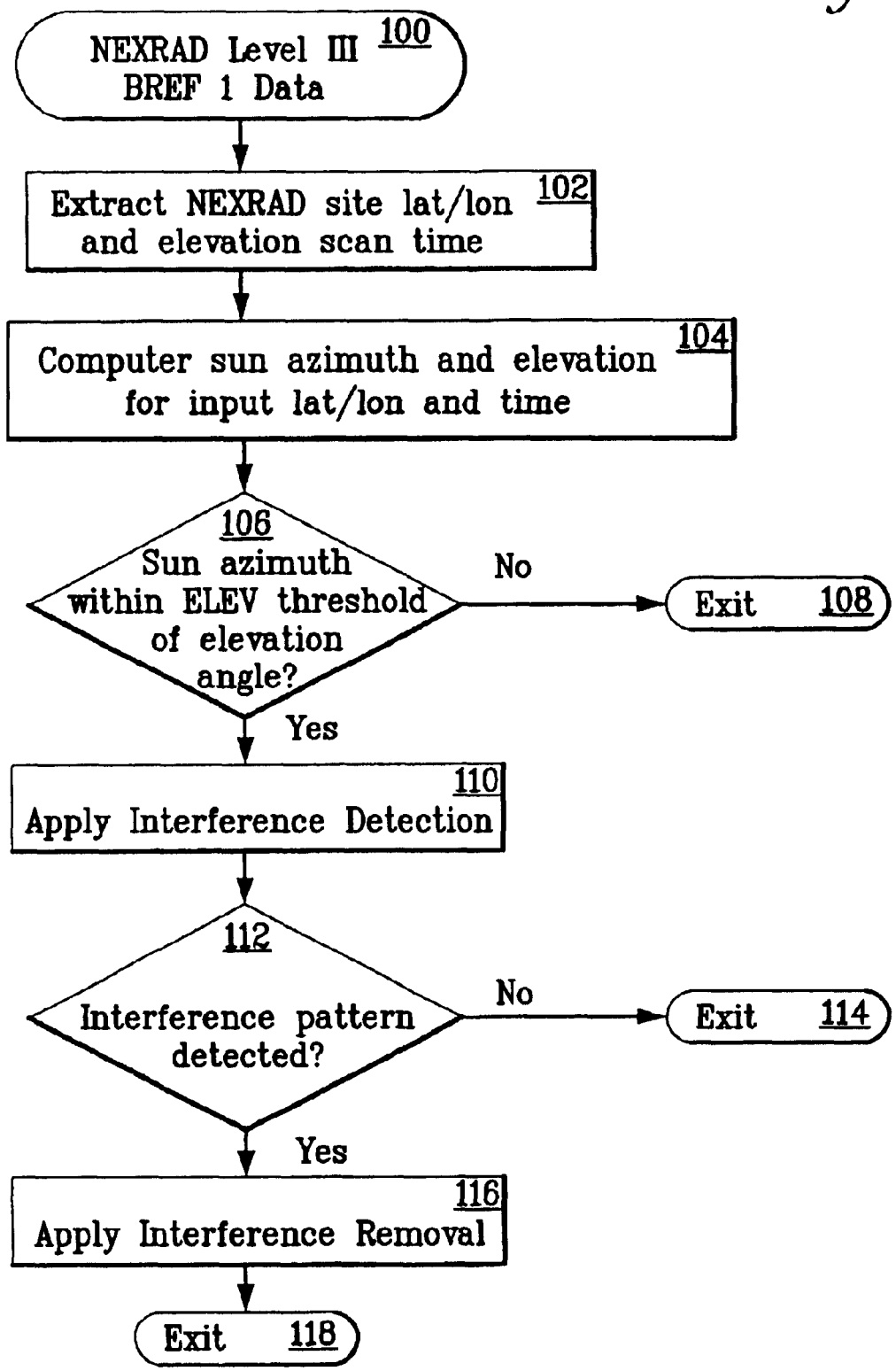
FIGS. 6-8 are flow charts illustrating the processes performed to remove Death Rays from radar data.

The solar interference removal process will now be described with reference to FIGS. 6-9. The process may be performed in any combination of computer hardware and/or software, as would be recognized by one of ordinary skill in the art. Referring now to FIG. 6, there is a high level flow chart of the process to remove solar interference from NEXRAD Level III Data. At step 100 the process begins by receiving NEXRAD Level III BREF I Data. At step 102, the NEXRAD site latitude and longitude and elevation scan time is extracted. At step 104, the Sun azimuth and elevation for the input latitude and longitude and time is determined. The determination of the Sun's azimuth is well known by those of ordinary skill in the art, and can be calculated based on start time of elevation scan and site latitude/longitude. For example, the Sun's position can be determined using the Solar Position Calculator at the National Oceanic and Atmospheric Administration Website. After the Sun's position is determined for the input latitude/longitude and time, it is determined if the Sun elevation is within a threshold elevation angle (ELEV). In accordance with the present invention, the ELEV threshold is between 0.5 and 1.3 degrees. In other words, the removal process is not run if the Sun elevation is more then 0.5 to 1.3 degrees of the scan elevation angle. Preferably, the value of ELEV is 0.5, however, it may need to be larger to compensate for situations where the NEXRAD clock is not correct. Thus, at step 106, if the Sun elevation is outside 0.5 to 1.3 of the scan elevation angle, then the process stops at step 108 as it is unlikely that solar interference has occurred. If the Sun's position is within the ELEV threshold, then the interference removal procedure (part 1) is run at step 110 to identify the radial having the greatest interference.

The procedure run at step 110 will now be explained in greater detail with reference to FIG. 7. The process of step 110 is preferably run because of the inaccuracies of NEXRAD clocks. At steps 120 and 122, from the NEXRAD Level III data, the radial closest to the Sun azimuth is identified and its neighbors. At step 124, the 7 radials closest to the computed Sun position are sorted based on the number of non-zero echoes in each radial. It is noted that a different number of radials may be sorted at step 124.

At step 126, it is determined If the number of echoes in the highest priority radial exceeds a SIZE threshold (e.g., 20). If not, then the routine exits at step 128 and returns "no interference detected." If the number of echoes exceeds the SIZE threshold, then it is determined if the difference of the number of echoes between the highest and lowest radial exceeds a DIFFERENCE percentage threshold (e.g., 10%). If not, then the routine exits at step 132 and returns "no interference detected." If the difference of the number of echoes between the highest and lowest radial exceeds the DIFFERENCE threshold at step 103, then it is determined at step 134 if the three highest priority radials are azimuthally consecutive, and if so, the azimuth of the middle radial is returned at step 138. In accordance with the present invention, for a three radial contamination, the solar removal process identifies the middle radial. Otherwise, if the three highest priority radials are not consecutive, then at step 136 the azimuth of radial with the highest number of non-zero echoes is returned.

Figure 7:
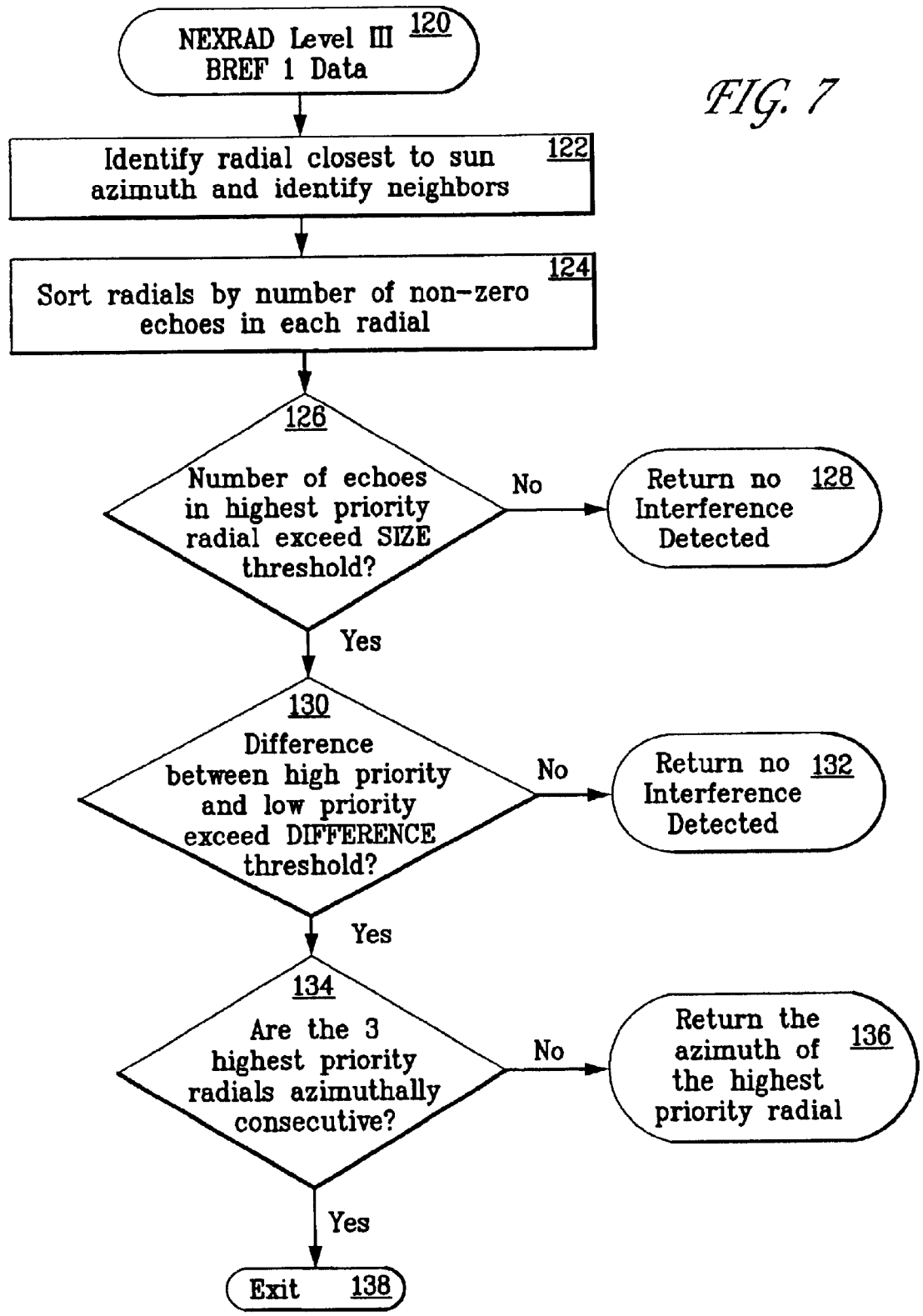

The processing returns to step 112, where it is determined if the process of FIG. 7 returned an interference pattern (i.e., either the azimuth of the highest priority radial or the middle radial of the three azimuthally consecutive highest priority radials). If so, then the interference removal procedure (part 2) is run at step 116, otherwise, the process ends at step 114.

Figure 8:
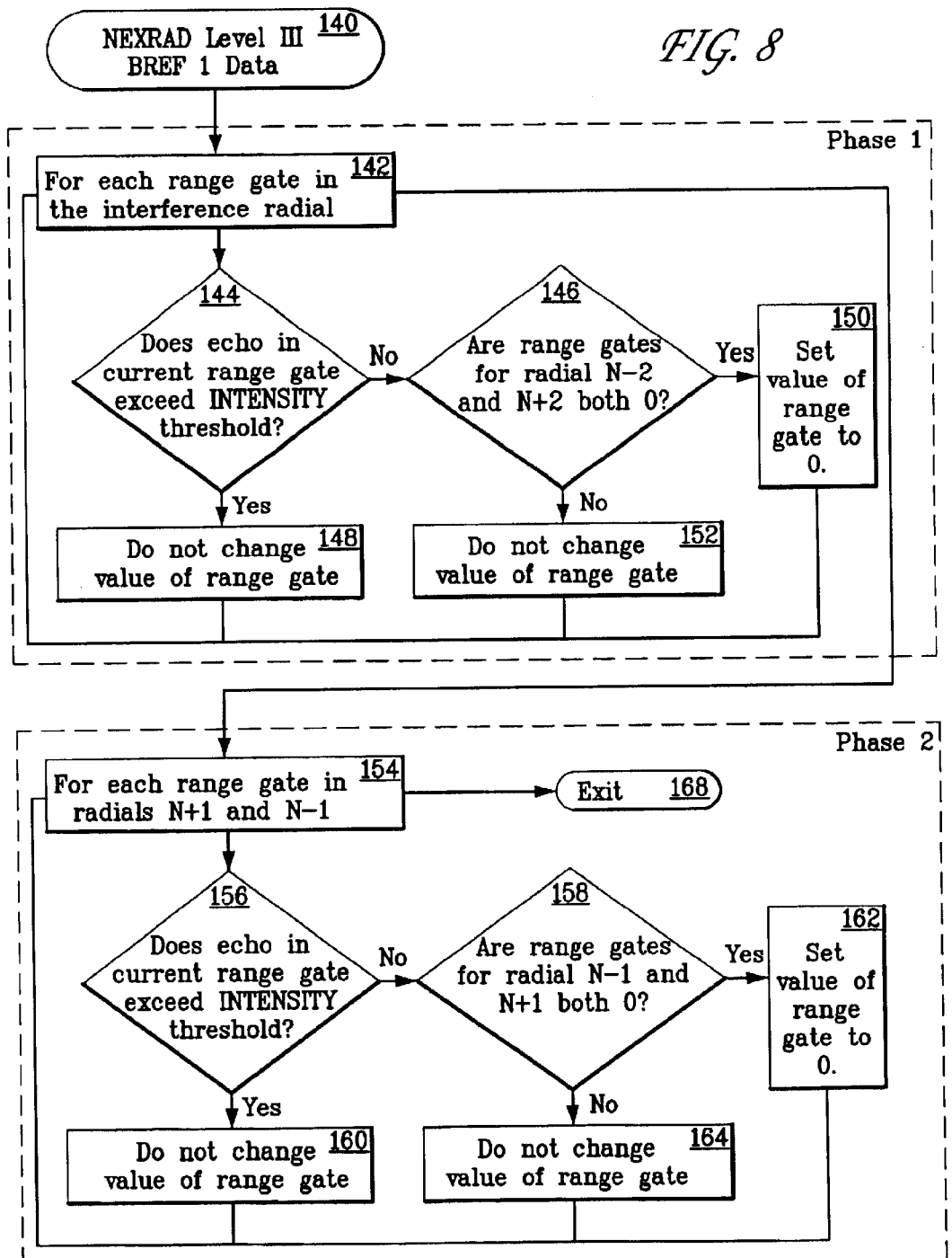
Figure 9:
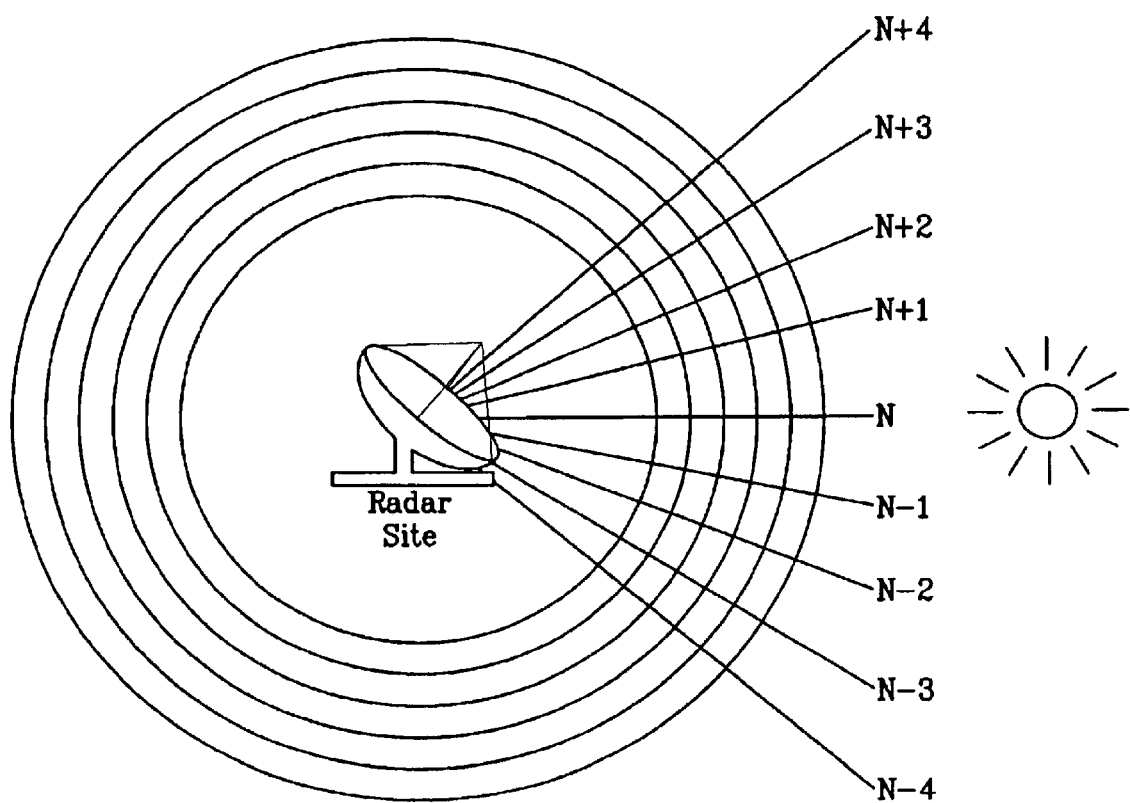
FIG. 9 illustrates an exemplary radar installation, radials and range gates.

The interference removal procedure of step 116 is shown in greater detail with reference to FIGS. 8 and 9, where from the NEXRAD Level III data (step 140) a two phase procedure is applied to the radials having interference. At step 142, for each range gate of the radial(s) identified as having interference, it is determined at step 144 if an echo in the current range gate exceeds an INTENSITY threshold. The INTENSITY threshold is variable over the length and increases as the range increases. The INTENSITY threshold is set at 25 dBZ when the range is less then 230 kM. Outside of 230 kM, the INTENSITY threshold is gradually increased to a maximum value (e.g. 40 dBZ) at the furthest range. The INTENSITY threshold provides a rough estimate of the presence of solar radiation as the Sun provides a constant signal which results in a greater computed dBZ value the further you go out in range. It is noted that the intensity of a Death Ray rarely exceeds 35 dBZ.

If at step 144 the echo in the current range gate exceeds the INTENSITY threshold, the value is not changed and the next range gate is examined. If the echo in the current range gate does not exceed the INTENSITY threshold, then at step 146, the current range gates for radials N−2 and N+2 (see, FIG. 9, where N is the current radial being examined) are examined to see if the echo for the current range gate for those radials is zero. It is assumed that if solar interference is present for radial N, that it will likely only affect radial N and radials N +/−1, but not radials +/−2. Thus, if the range gates for the radials N−2 and N+2 are not zero, then the value of the current range gate for radial N is not changed at step 152 and the next range gate for the radial is examined at step 142. Otherwise, at step 150 the value of the current range gate for radial N is set to 0 at step 150 and the next range gate for the radial is examined at step 142.

Once all of the range gates are examined at steps 142–152, then the phase 2 is performed beginning at step 154 where for each range gate of the N+1 and N−1 radial(s), it is determined at step 156 if an echo in the current range gate exceeds an INTENSITY threshold. The INTENSITY threshold is the same as noted above with regard to step 144. If at step 156 the echo in the current range gate exceeds the INTENSITY threshold, the value is not changed and the next range gate is examined at step 154. If the echo in the current range gate does not exceed the INTENSITY threshold, then at step 158, the current range gates for radials N−1 and N+1 are examined to see if the echo for the current range gate for those radials is zero. Thus, if the range gates for the radials N−1 and N+1 are not zero, then the value of the current range gate for radial N is not changed at step 164 and the next range gate for the radial is examined at step 142. Otherwise, at step 162 the value of the current range gate for the radial is set to 0 at step 162 and the next range gate for the radial is examined at step 154. Once all range gates are examined at steps 154–164, the process exits at step 166 to return to step 118, where the main routine exits.

Figure 1:
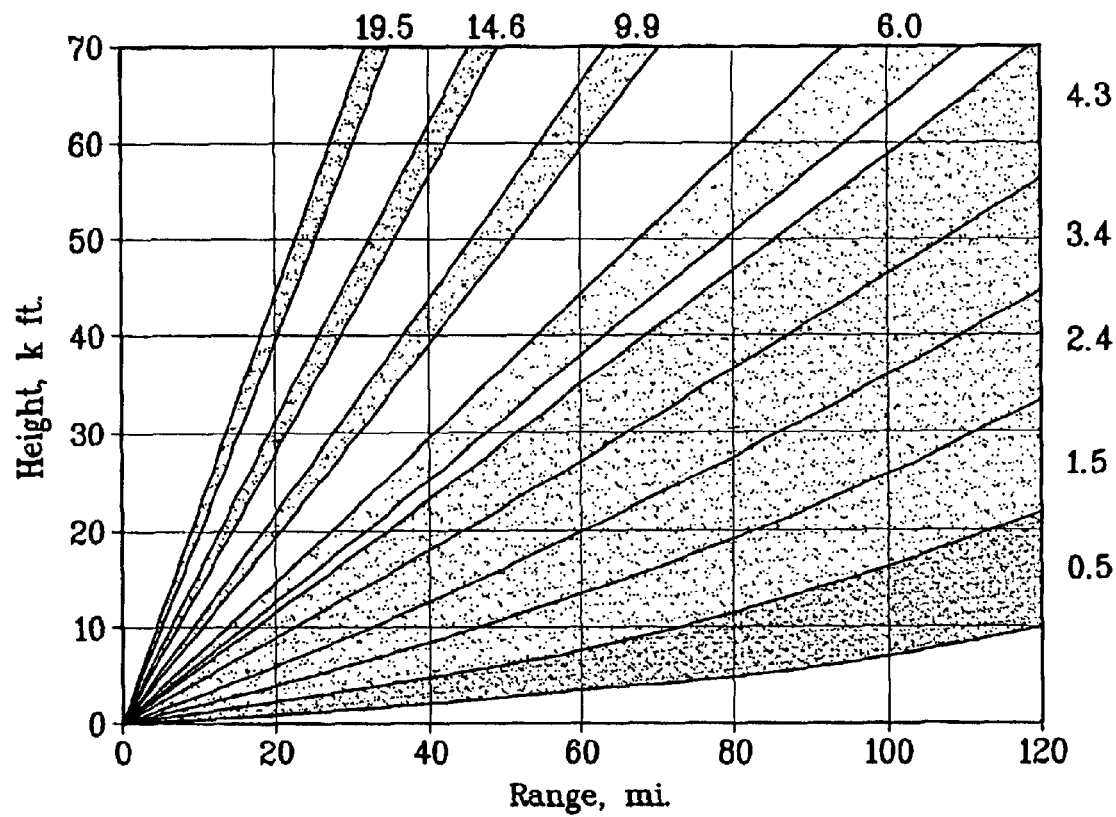
FIG. 1 is a graph of elevation angles vs. range for NEXRAD radar sites.
Figure 2:
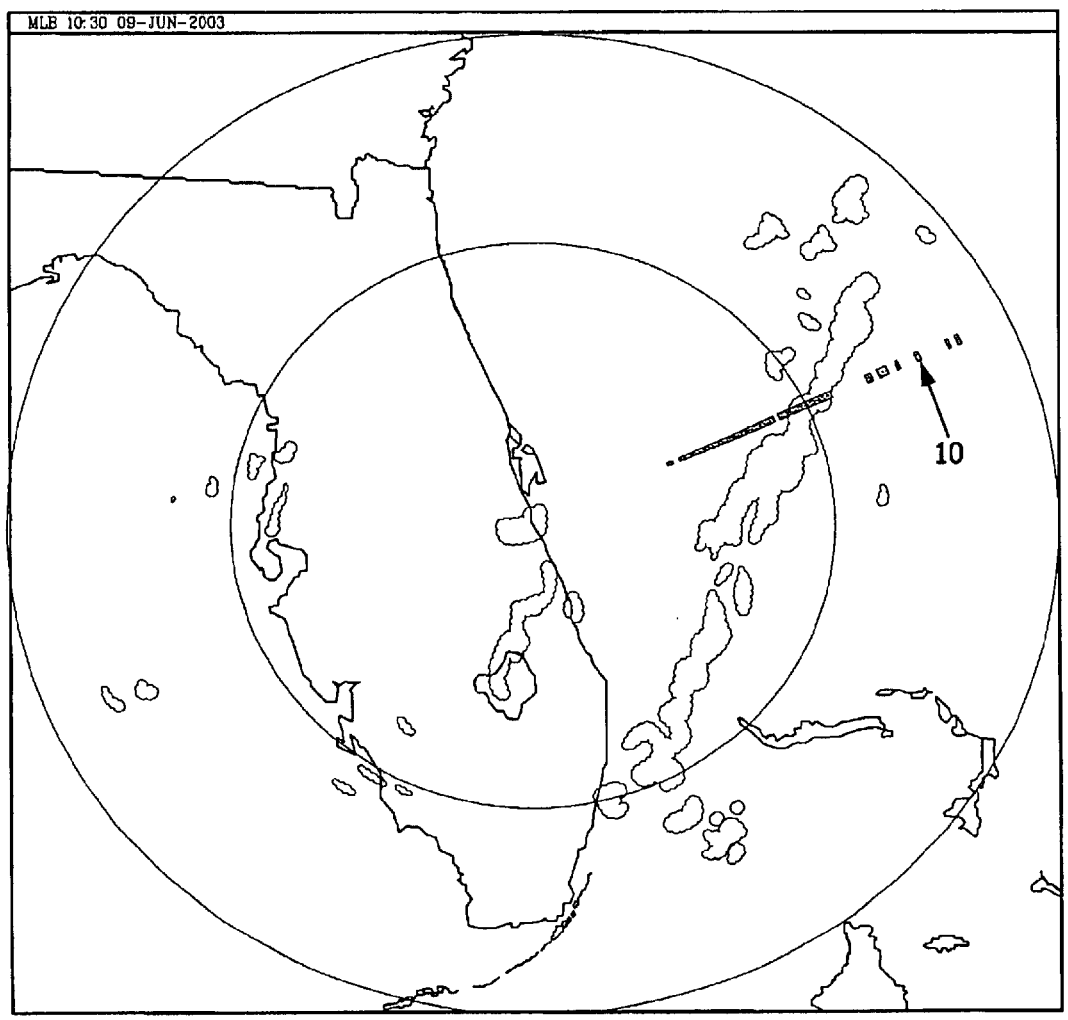
FIGS. 2 and 3 are exemplary radar products showing Death Rays.
Figure 3:
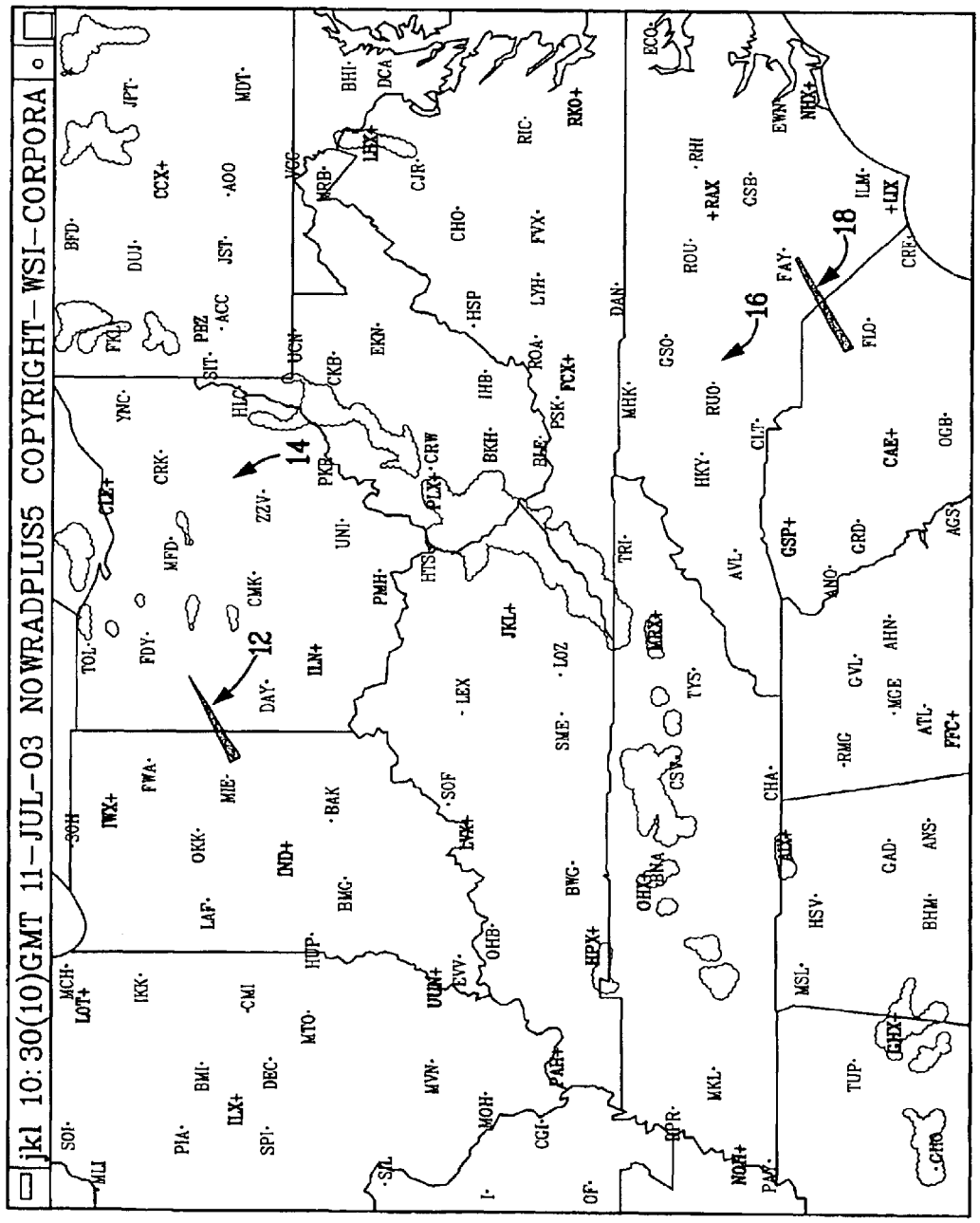
Figure 4:
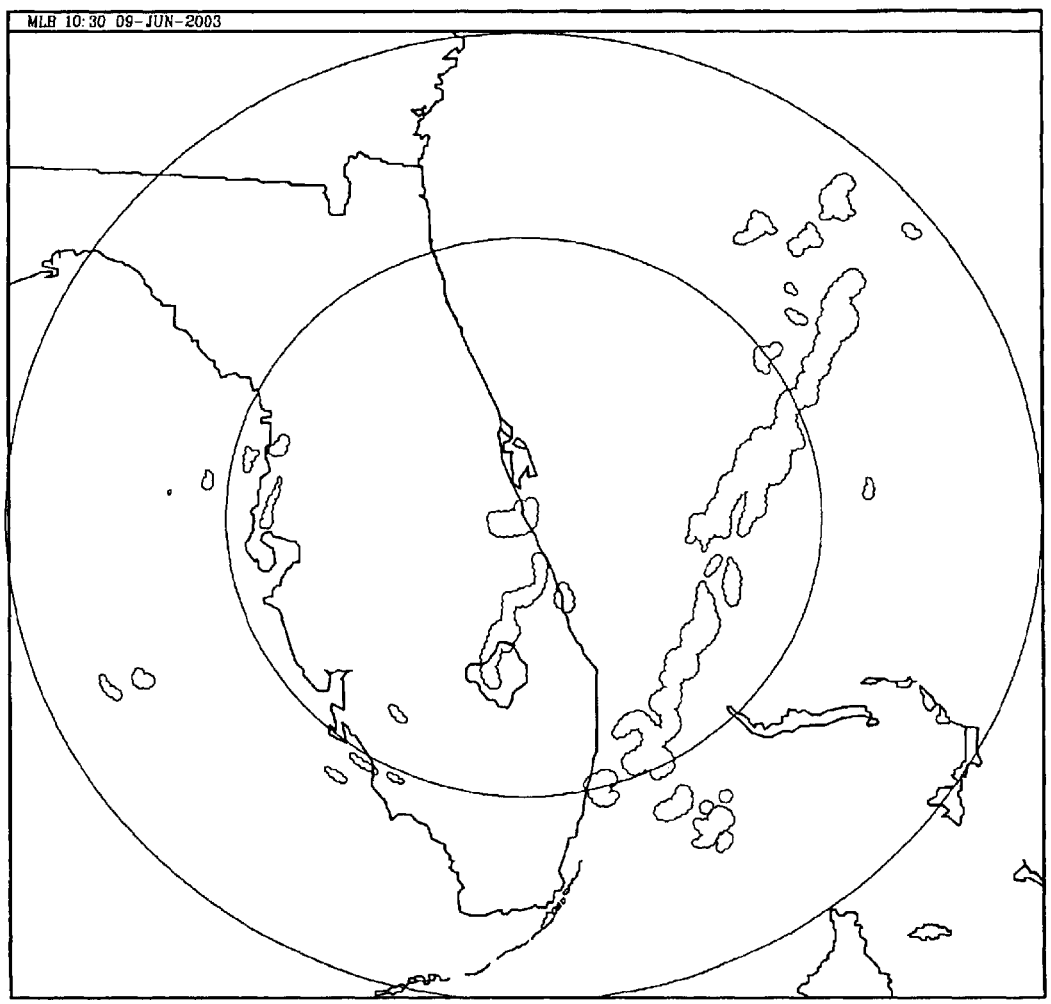
FIGS. 4 and 5 are the exemplary radar products of FIGS. 2 and 3, respectively, after the solar interference removal process of the present invention has removed the Death Rays.
Figure 5:
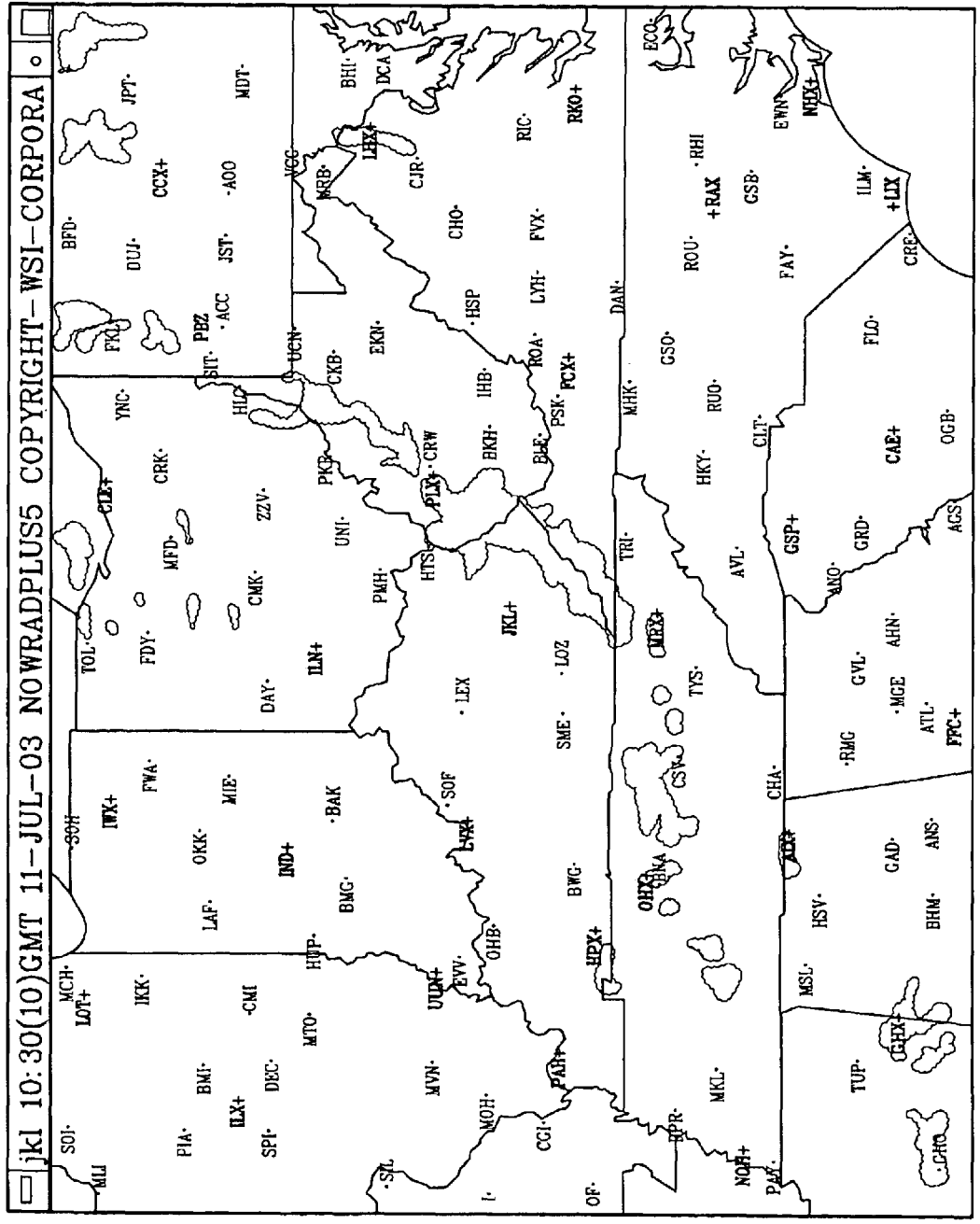

In accordance with the present invention, an examination of a radial and its neighbors is performed such that only the radial data that actually was affected by solar radiation is removed. This way, the Death Ray is removed while true echoes remain. The operation of the present invention can been seen by examining FIG. 2 vs. 4 and FIG. 3 vs. 5, where the removal of death rays 10, 12, 14, 16 and 18 is evident, while the real echoes are retained.

While the present invention has been described in connection with the preferred embodiments of the various Figs., it is to be understood that other similar embodiments may be used or modifications and additions may be made to the described embodiment for performing the same function of the present invention without deviating therefrom. For example the process could be applied to other NEXRAD Level III elevation scans and products (i.e., velocity), NEXRAD Level II data, or other radars (i.e. TDWR, customer radars, etc.).

Furthermore, it should be emphasized that a variety of computer platforms, including handheld device operating systems and other application specific operating systems are contemplated. Still further, the present invention may be implemented in or across a plurality of processing chips or devices, and storage may similarly be effected across a plurality of devices.

Therefore, the present invention should not be limited to any single embodiment, but rather should be construed in breadth and scope in accordance with the appended claims.

What is claimed is:

1. A method of removing solar interference from radar data acquired from a radar site location, comprising:
    extracting a site latitude, a site longitude and scan elevation time from the radar data;
    determining the position of the Sun for the site latitude, the site longitude and the scan time;
    determining if a radial has been contaminated with solar interference; and
    removing the solar interference.

2. The method of claim 1, wherein said method is performed if the Sun's position is with approximately a threshold elevation angle of an elevation scan angle.

3. The method of claim 2, wherein the threshold elevation angle is between 0.5 and 1.3 degrees.

4. The method of claim 1, further comprising accounting for inaccuracies in a clock at a radar site from which the radar data was received.

5. The method of claim 1, further comprising:
    identifying the radial closest to a Sun azimuth and said radial's neighboring radials; and
    sorting a predetermined number of radials closest to the Sun position based on a number of non-zero echoes in each radial.

6. The method of claim 1, wherein determining if a radial has been contaminated with solar interference further comprises:
    determining if the number of non-zero echoes in a highest priority radial exceeds a predetermined threshold number of non-zero echoes;
    determining if a difference of the number of non-zero echoes between the highest and lowest radial exceed a percentage threshold; and
    determining if a three highest priority radials are azimuthally consecutive, and if so, returning a middle radial, otherwise returning a radial with the highest number of non-zero echoes.

7. The method of claim 1, wherein removing the solar interference further comprises:
    for each range gate of a radial N identified as being contaminated by solar interference, determining if an echo in a current range gate exceeds an intensity threshold; and
    for echoes in the current range gate that do not exceed the intensity threshold, examining the current range gates for radials N−2 and N+2 determine if an echo for the current range gate for those radials is zero.

8. The method of claim 7, wherein the intensity threshold is variable over a length and increases as the range increases for a radial.

9. The method of claim 7, wherein if the range gates for the radials N−2 and N+2 are not zero, then the value of the current range gate for radial N is not changed and the next range gate for the radial N is examined.

10. The method of claim 7, wherein if the range gates for the radials N−2 and N+2 are zero, then the value of the current range gate for radial N is changed to zero and the next range gate for the radial N is examined.

11. The method of claim 7, further comprising:
for each range gate of the N+1 and N−1 radials, determining if an echo in a current range gate in the N+1 or N−1 radial does not exceed the intensity threshold; and
if an echo in the current range gate in the N+1 or N−1 radial does not exceed the intensity threshold, examining if the current range gates for both radials N−1 and N+1 are zero; and
setting a value of the current range gate for the radial N to 0 if the current range gates for both radials N−1 and N+1 are zero.

12. A method of determining if radar data acquired from a radar site location contains solar interference, comprising:
extracting a site latitude, a site longitude and scan elevation time from the radar data;
determining the position of the Sun for the site latitude, site longitude and the scan time;
determining if an elevation angle of the Sun is within approximately a threshold elevation angle of an elevation scan angle; and
examining radar data for radials closest to the Sun's position if the Sun is approximately said threshold elevation angle.

13. The method of claim 12, wherein the threshold elevation angle is between 0.5 and 1.3 degrees.

14. The method of claim 12, wherein examining radar data for radials closest to the Sun's position further comprises:
determining if the number of non-zero echoes in a highest priority radial exceeds a predetermined threshold number of non-zero echoes;
determining if a difference of the number of non-zero echoes between the highest and lowest radial exceed a percentage threshold; and
determining if a three highest priority radials are azimuthally consecutive, and if so, returning a middle radial, otherwise returning a radial with the highest number of non-zero echoes.

15. The method of claim 12, further comprising removing the solar interference from radials containing said solar interference.

16. The method of claim 15, wherein removing the solar interference further comprises:
for each range gate of a radial N identified as being contaminated by solar interference, determining if an echo in a current range gate exceeds an intensity threshold; and
for echoes in the current range gate that do not exceed the intensity threshold, examining the current range gates for radials N−2 and N+2 determine if an echo for the current range gate for those radials is zero.

17. The method of claim 16, wherein the intensity threshold is variable over a length and increases as the range increases for a radial.

18. The method of claim 16, wherein if the range gates for the radials N−2 and N+2 are not zero, then the value of the current range gate for radial N is not changed and the next range gate for the radial N is examined.

19. The method of claim 16, wherein if the range gates for the radials N−2 and N+2 are zero, then the value of the current range gate for radial N is changed to zero and the next range gate for the radial N is examined.

20. The method of claim 16, further comprising:
for each range gate of the N+1 and N−1 radials, determining if an echo in a current range gate in the N+1 or N−1 radial does not exceed the intensity threshold; and
if an echo in the current range gate in the N+1 or N−1 radial does not exceed the intensity threshold, examining if the current range gates for both radials N−1 and N+1 are zero; and
setting a value of the current range gate for the radial N to 0 if the current range gates for both radials N−1 and N+1 are zero.

21. A method of determining and removing solar interference from radar data acquired from a radar site location, comprising:
extracting a site latitude, a site longitude and scan elevation time from the radar data;
determining the position of the Sun for the site latitude, the site longitude and the scan time;
determining if an elevation angle of the Sun is within approximately a threshold elevation angle of an elevation scan angle, and if so:
compensating for inaccuracies in a clock time associated with said radar data;
determining if a radial has been contaminated with solar interference if the Sun's position is approximately a threshold angle; and
removing the solar interference.

22. The method of claim 21, wherein the threshold elevation angle is between 0.5 and 1.3 degrees.

23. The method of claim 21, wherein determining if a radial has been contaminated with solar interference further comprises:
determining if the number of non-zero echoes in a highest priority radial exceeds a predetermined threshold number of non-zero echoes;
determining if a difference of the number of non-zero echoes between the highest and lowest radial exceed a percentage threshold; and
determining if a three highest priority radials are azimuthally consecutive, and if so, returning a middle radial, otherwise returning a radial with the highest number of non-zero echoes.

24. The method of claim 21, wherein removing the solar interference further comprises:
for each range gate of a radial N identified as being contaminated by solar interference, determining if an echo in a current range gate exceeds an intensity threshold;
for echoes in the current range gate that do not exceed the intensity threshold, examining the current range gates for radials N−2 and N+2 determine if an echo for the current range gate for those radials is zero; and
if the range gates for the radials N−2 and N+2 are not zero, then the value of the current range gate for radial N is not changed, and if the range gates for the radials N−2 and N+2 are zero, then the value of the current range gate for radial N is changed to zero; and examining the next range gate for the radial N is examined.

25. The method of claim 24, further comprising:

for each range gate of the N+1 and N−1 radials, determining if an echo in a current range gate in the N+1 or N−1 radial does not exceed the intensity threshold; and if an echo in the current range gate in the N+1 or N−1 radial does not exceed the intensity threshold, examining if the current range gates for both radials N−1 and N+1 are zero; and setting a value of the current range gate for the radial N to 0 if the current range gates for both radials N−1 and N+1 are zero.

* * * * *